(12) United States Patent
Thirase et al.

(10) Patent No.: US 7,382,530 B2
(45) Date of Patent: Jun. 3, 2008

(54) METHOD FOR THE ADJUSTMENT OF A LIGHT SOURCE IN A MICROSCOPE

(75) Inventors: Jan Thirase, Goettingen (DE); Bruene Venus, Goettingen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 50 days.

(21) Appl. No.: 11/539,390

(22) Filed: Oct. 6, 2006

(65) Prior Publication Data

US 2007/0097497 A1 May 3, 2007

(30) Foreign Application Priority Data

Oct. 6, 2005 (DE) .................. 10 2005 048 555

(51) Int. Cl.
*G02B 21/06* (2006.01)
(52) U.S. Cl. ...................................... 359/385; 359/390
(58) Field of Classification Search ................. 359/368, 359/385–390
See application file for complete search history.

(56) References Cited

U.S. PATENT DOCUMENTS 6,819,484 B2   11/2004   Aono et al.

FOREIGN PATENT DOCUMENTS

| DE | 198 22 924 | 5/1998 |
|---|---|---|
| DE | 101 43 481 | 9/2001 |
| DE | 102 17 098 | 4/2002 |
| DE | 102 29 935 | 7/2002 |
| DE | 102 58 945 | 12/2002 |
| DE | 102 08 781 | 9/2003 |
| JP | 2003-215462 | 7/2003 |

*Primary Examiner*—Joshua L Pritchett
(74) *Attorney, Agent, or Firm*—Reed Smith LLP

(57) ABSTRACT

A method by which the illumination radiation to be coupled into the illumination beam path of a microscope can be exactly monitored and/or adjusted. In the method for adjusting a light source for a microscope, an imaging optical reflection unit, instead of the objective, is coupled to the microscope in order to image the light of the light source on a detector in such a way that a monitoring of the focus position and/or the position and/or an adjustment of the laser light source with respect to the focus position and/or the position can be carried out. Provided is an approach for monitoring and adjusting a laser beam to be coupled into the illumination beam path of a microscope particularly for using TIRF effects. It can also be used in principle for other solutions in which the parallelism of illumination beams must be monitored and/or adjusted.

11 Claims, 4 Drawing Sheets

METHOD FOR THE ADJUSTMENT OF A LIGHT SOURCE IN A MICROSCOPE

CROSS-REFERENCE TO RELATED APPLICATION

This application claims priority of German Application No. 10 2005 048 555.3, filed Oct. 6, 2005, the complete disclosure of which is hereby incorporated by reference.

BACKGROUND OF THE INVENTION a) Field of the Invention

The present invention is directed to method by which the laser radiation to be coupled into the illumination beam path of a microscope can be exactly monitored and/or adjusted.

b) Description of the Related Art

In TIRF (Total Internal Reflection Fluorescence) microscopy, for example, a high axial resolution is achieved by emitting illumination radiation into a high-aperture objective in such a way that total internal reflection occurs at the surface of the specimen. The radiated power is introduced into the optically thinner specimen medium only as an evanescent field. In this way, near-interface molecules are excited to fluorescence. For this purpose, the aperture of the objective that is used must be greater than the refractive index of the specimen to be examined. Since biological specimens typically have a refractive index from 1.33 to 1.38, objectives with numerical apertures greater than 1.4 are used in practice. The penetration depth of the evanescent field depends on the aperture of the objective; the greater the aperture, the smaller the penetration depth.

The total reflection of the extremely small light point of the exciting light at defined interfaces makes it possible to observe individual molecules, which was formerly only possible with an electron microscope. Accordingly, high-contrast images of the flagged molecules, cell membranes or cell walls can be generated in real time. The researcher can observe dynamic processes such as the movements of molecules in the cell membrane, the exchange of molecules between membrane and liquid, or the movement of cell organelles. Therefore, TIRF systems open up completely new dimensions in light microscopy.

An important condition for achieving TIRF effects is the parallelism of the polarized laser radiation at the location of the specimen. This can be achieved by moving a waist of the laser beam into the entrance pupil of the objective by means of an adjusting device.

It was formerly conventional to observe the laser beam in the far field and to adjust the adjustment device in such a way that the diameter of the laser beam is minimal in the far field, which is equivalent to a parallel bundle propagation at the location of the object. In the laboratory, the ceiling of the laboratory was usually used for this purpose. However, this type of method is not permissible if the required safety guidelines for the use of lasers are to be obeyed.

Aside from the parallelism of the laser beam at the location of the specimen, the adjustment of the angle at which the laser radiation strikes the specimen is critically important. This angle, which corresponds to the position of the focus in the exit pupil, determines whether or not total reflection occurs, and the extent of the penetration depth of the evanescent field also depends upon this angle. The position of the focus in the exit pupil is imaged on the camera by the adjustment device. Accordingly, it is possible to determine this position by means of the adjustment device and also to calculate the penetration depth of the evanescent field.

There are also known prior art solutions by which the characteristics of laser beams can be exactly determined and corrected before impinging on a specimen.

DE 198 22 924 C2 describes a method and a device for measuring the distribution of the energy field density of a pulsed laser beam. For this purpose, a measurement beam is extracted at different points in time and imaged on a CCD chip so as to be locally separated. The measured energy densities in the processing focus of the laser beam can be compared with one another and correct when needed. The described solution is provided particularly for process monitoring in laser machining of workpieces.

DE 102 08 781 A1 discloses a solution for determining the intensity distribution when a laser beam impinges on a surface. For this purpose, the intensity distributions are detected in a plurality of planes of the laser beam and arranged as digital image data in a computerized manner, and the intensity distribution on the surface is calculated therefrom by interpolation. Intensity distributions can be determined for non-planar surfaces and for surfaces not extending perpendicular to the beam axis. This solution is also particularly suited to process monitoring in laser machining of workpieces and is applicable for continuous laser sources as well as pulsed laser sources.

DE 102 17 098 A1 describes an incident illumination device for a microscope, particularly a TIRF microscope. It places particular emphasis on achieving a high polarization of the laser beam. In addition to the exact radiating angle, a high polarization of the laser radiation is also an important criterion for achieving a high efficiency. The radiating angle substantially corresponds to the critical angle of the total reflection at the specimen. The illumination device allows the radiating angle to be changed so as to ensure that the excitation beam is coupled in optimally.

A microscope in which at least one illumination beam can be displaced radially with respect to the optical axis is described in DE 101 43 481 A1. The greater the distance of the incident illumination beam from the optical axis in radial direction when impinging through the objective, the greater the reflection angle of the illumination beam at the interface between the object carrier and the object. The reflected proportion of the illumination beam is absorbed so as not to interfere with microscopic examination of the object. A deliberate adjustment of the arrangement is made possible in that the light reflected at the interface is guided to a detector and correspondingly evaluated.

In the fluorescence-based optical object examination device, particularly for TIRF microscopy, according to DE 102 58 945 A1, the light that is reflected from the interface is directed to a light trap arrangement. This defined beam trap arrangement prevents interfering scattered light and accordingly makes it possible to detect very weak fluorescent signals by preventing interfering background fluorescence on the one hand and by improving the signal-to-noise ratio at the detector on the other hand.

In the TIRF microscope described in U.S. Pat. No. 6,819,484 A, the light that is reflected from the interface is directed to a light trap arrangement which is arranged outside the microscope in a special construction. The synchronous movement of the optical elements which couple in and couple out the illumination light ensures that the light reflected at the interface is directed in its entirety to the light trap arrangement, even with altered radiating angles.

Another device for coupling light into a microscope is described in DE 102 29 935 A1. This devices makes use of an access for coupling in the light of a second light source, e.g., of a laser, without having to make further changes in the illumination beam path. The access is standard on most microscopes and is provided, as such, for receiving special devices for contrasting (e.g., DIC slides). The light beam can be directed to the edge area of the exit pupil of a high-aperture objective in a particularly simple manner because of the provided possibility for tilting the coupled-in light beam relative to the optical axis, and the TIRF method can accordingly be realized.

Also, the microscope described in JP 2003-215 462 A discloses a solution in which none of the optical elements required for imaging need be removed. Instead, a mirror is swiveled into the beam path in front of the object for adjusting the illumination of the microscope, which mirror images the illumination light on the detector via the elements needed for imaging and a Bertrand lens which is added into the beam path in front of the detector. The light spot that is formed is correspondingly evaluated for adjusting the microscope.

The solutions mentioned above are too involved to be used for adjustment for TIRF. An important condition for the TIRF effect is that the laser radiation is parallel at the location of the specimen. This is achieved by moving a waist of the laser beam into the entrance pupil of the objective by an adjusting device.

OBJECT AND SUMMARY OF THE INVENTION

The primary object of the present invention is to develop an adjusting method for the laser source of a microscope by which a laser beam to be coupled into the illumination beam path can be monitored and/or adjusted in a simple manner with respect to its parallelism and/or its position.

In the method, according to the invention, for adjusting the laser source of a microscope, an imaging optical reflection unit, instead of the objective, is coupled to the microscope in order to image the light of the laser source on a detector in such a way that monitoring of the focus position and/or adjustment of the laser light source can be carried out.

According to the invention, this object is met in accordance with the invention by a method for adjusting a light source for a microscope comprising an imaging optical reflection unit, instead of an object, to the microscope in order to image the light of the light source on a detector in such a way that a monitoring of the focus position and/or the position and/or adjustment of the laser light source with respect to the focus position and/or the position could be carried out.

The proposed technical solution for monitoring and adjusting a laser beam to be coupled into the illumination beam path of a microscope is provided particularly for using the TIRF effect, but can also be used in principle for other solutions in which the parallelism of illumination beam paths must be monitored and/or adjusted.

The invention will be described more fully in the following with reference to embodiment examples.

DESCRIPTION OF THE PREFERRED EMBODIMENTS

In the method according to the invention for adjusting the TIRF illumination in a microscope, an imaging optical reflection unit, instead of the objective, is coupled to the microscope in order to image the light of the light source serving as TIRF illumination on a detector in such a way that the focus position can be monitored and/or the laser light source can be adjusted. The imaging optical reflection unit is so dimensioned that the light of the laser light source used for TIRF illumination is focused on the detector at the precise moment that the laser light source is focused on the exit pupil of the objective. In a first construction, a collecting mirror without additional optical elements can be used as a reflection unit.

Figure 1:
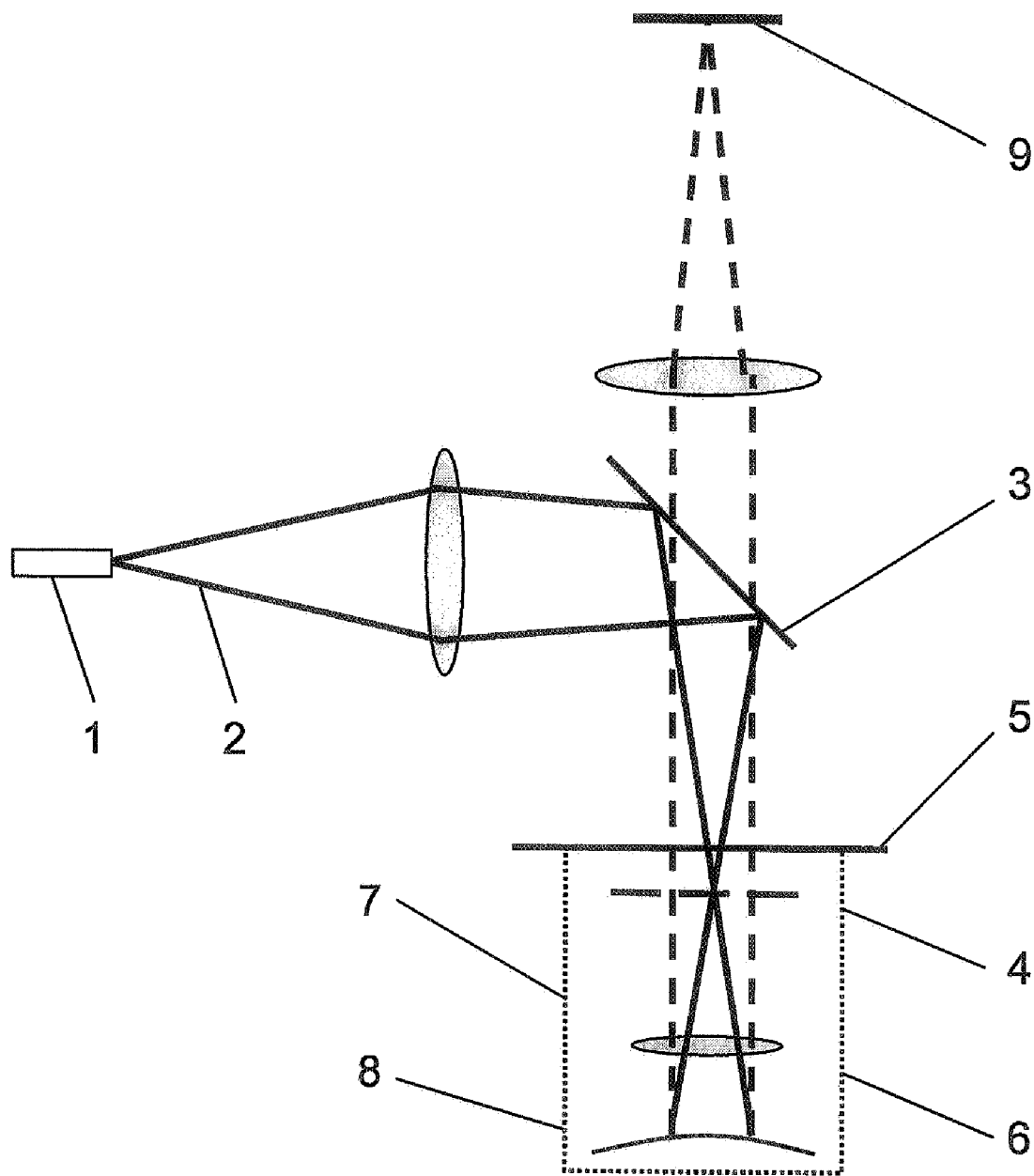
FIG. 1 shows the basic beam path in a microscope during adjustment.

FIG. 1 shows the basic beam path in a microscope during the adjustment. Proceeding from the laser light source 1, the laser light 2 used for TIRF illumination is focused, via a semitransparent mirror 3, in the exit pupil 4 of the objective used for TRF microscopy. For adjustment of the laser light source 1, an imaging optical reflection unit 6 is positioned at the optical contact surface 5 at which the objective used for TIRF microscopy would otherwise be arranged.

Figure 2:
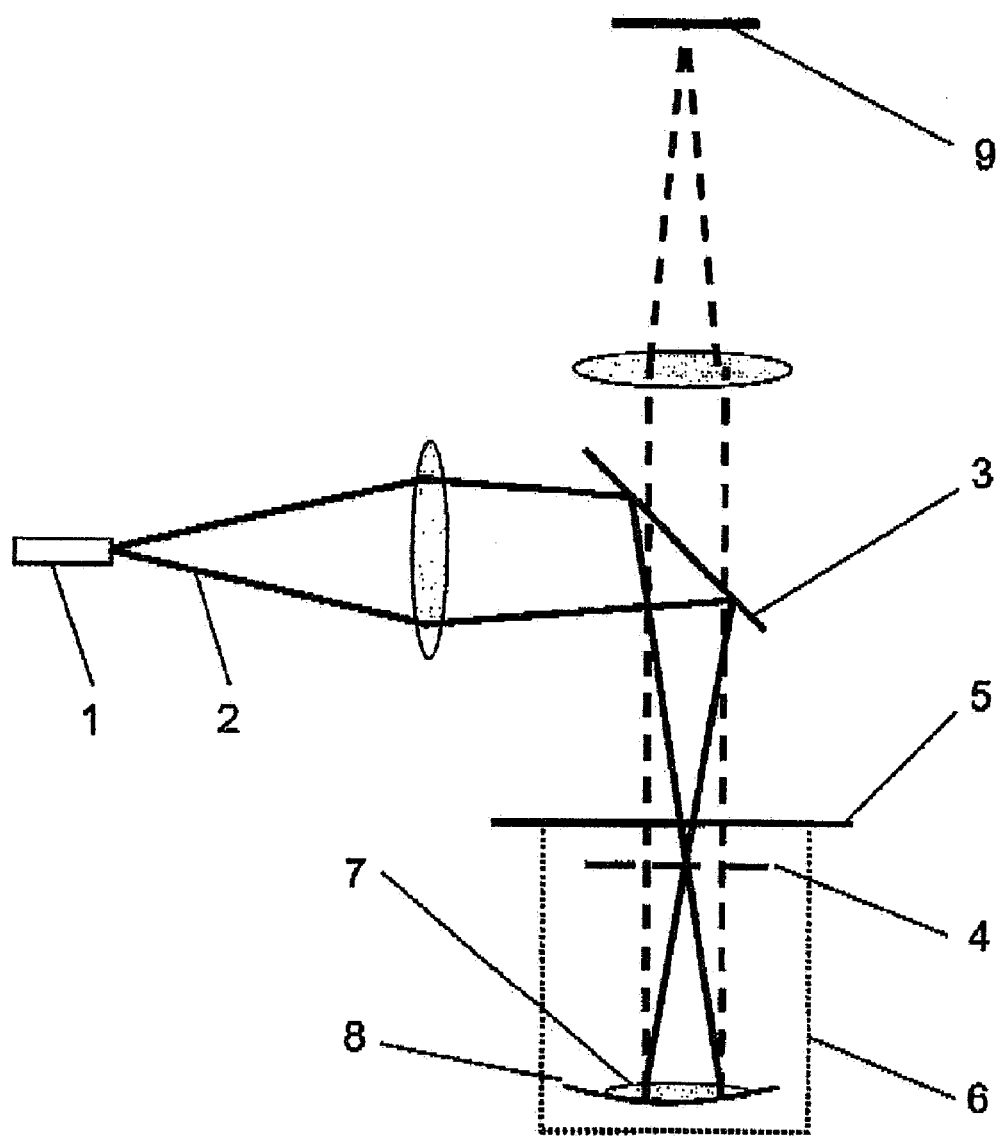
FIG. 2 illustrates a further construction of the beam path during adjustment.

This imaging optical reflection unit 6 comprises a lens 7 and a reflection element 8 which can have a flat surface or a curved surface. Instead of the lens 7, a lens system can also be used. Further, it is possible to construct the reflection element 8 as a reflecting surface on the lens 7 or lens arrangement as shown in FIG. 2.

The laser light 2 is focused on the detector 9 by the imaging optical reflection unit 6 via a semitransparent mirror 3. An exact focusing of the laser light 2 on the detector 9 is carried out precisely when the laser light source 1 is focused in the exit pupil 4. In the simplest case, a camera which is already provided in most microscopes is used as detector 9.

Figure 3:
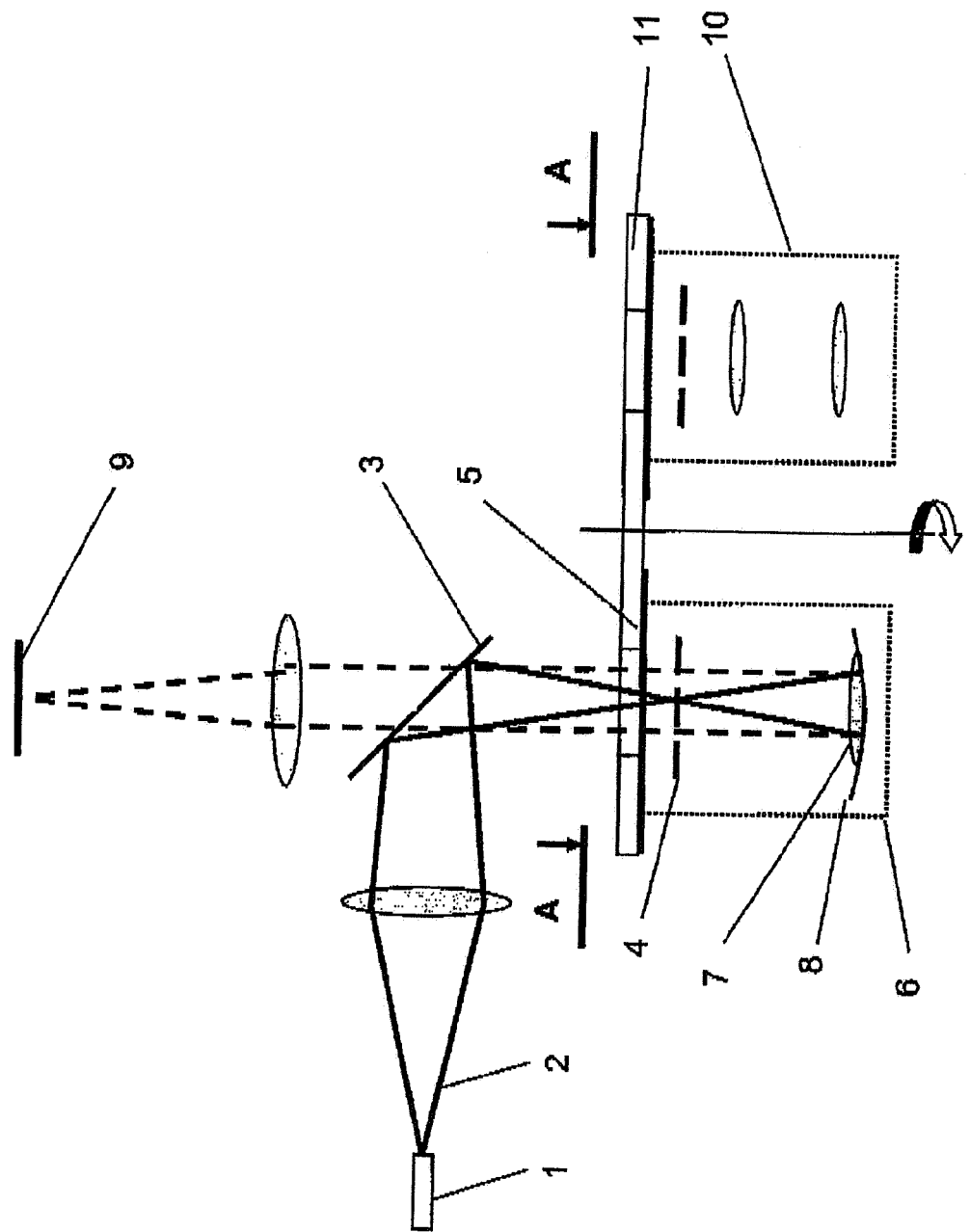
FIG. 3 illustrates an embodiment of the invention which arranges the imaging optical reflection unit and the objective on an objective turret.
Figure 4:
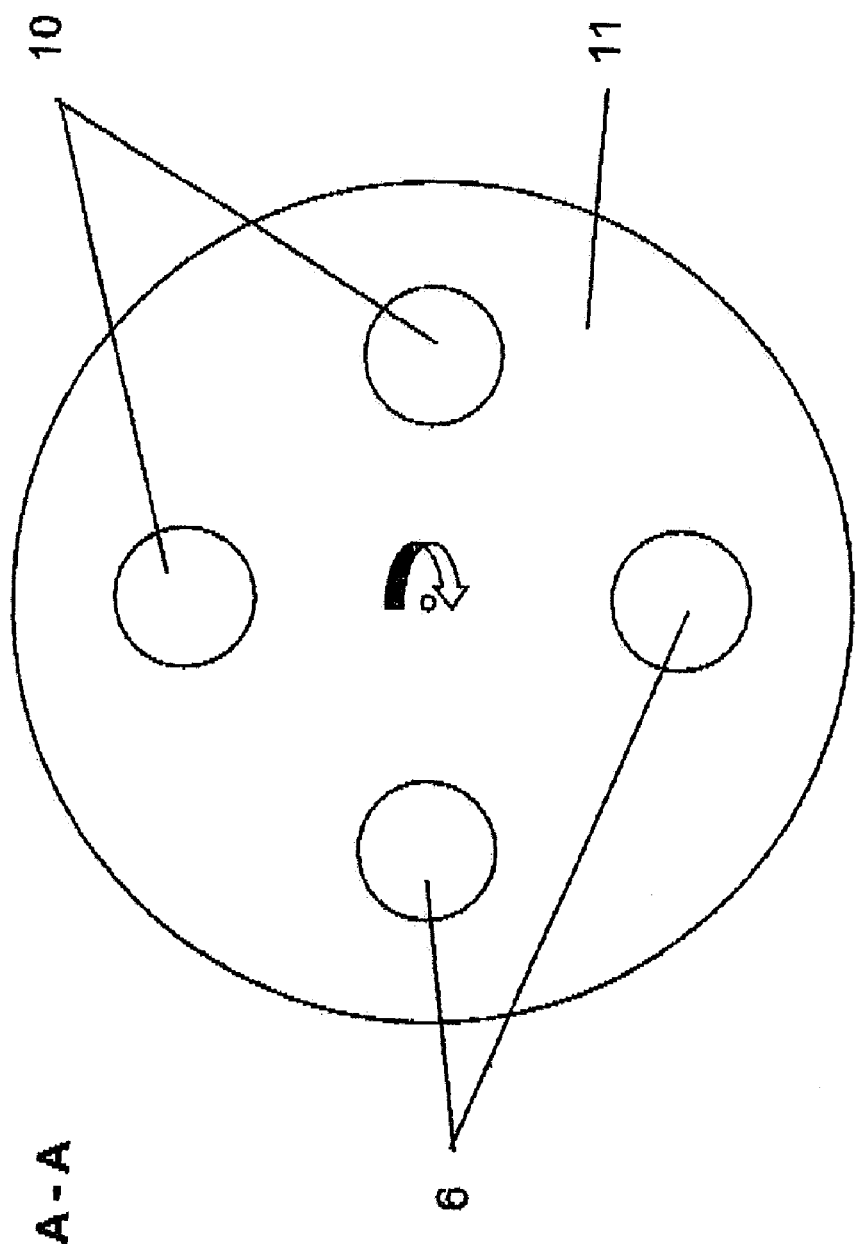
FIG. 4 illustrates a further embodiment where a plurality of imaging optical reflection units are objectives arranged on an objective turret.

In a further embodiment, the imaging optical reflection unit 6 and the objective 10 are arranged on an objective turret 11 as shown in FIG. 3. FIG. 4 shows a plurality of imaging optical reflection units 6 and objectives 10 which are arranged on an objective turret 11.

The focusing of the laser light source 1 can be monitored and/or adjusted by actuating mechanisms by evaluating the image of the laser light 2 focused on the detector 9.

In an advantageous construction, a magnified image of the laser light source 1 is projected onto the detector 9 to facilitate the evaluation of the imaging optical reflection unit 6.

In order to protect the detector from the high intensity of the laser radiation which strikes the detector only during the adjustment of the TIRF illumination, the imaging optical reflection unit has an additional filter which is preferably formed as a neutral filter.

In another advisable construction, the imaging optical reflection unit and the objective are arranged on an objective turret. This has the advantage that the reflection unit can be inserted quickly into the beam path for the adjustment and monitoring of the TIRF illumination and immediately has the defined position required for this purpose with respect to the exit pupil of the objective used for TIRF microscopy.

Since the reflection unit can only be adapted to one objective, it is also possible for a plurality of reflection units for different objectives that can be used for TRF microscopy to be arranged on the objective turret.

The method according to the invention provides a simple and fast solution for adjusting the TIRF illumination of a microscope. Personnel are protected from the high intensity of the laser light because it is not possible for laser radiation to exit into the room. Therefore, every user is able to monitor the focusing of the TIRF illumination and to adjust it in a corresponding manner.

The proposed method ensures a simple and fast adjustment of the laser source, particularly for TRF illumination, in an economical, highly safe and reproducible manner while maintaining laser safety guidelines.

While the foregoing description and drawings represent the present invention, it will be obvious to those skilled in the art that various changes may be made therein without departing from the true spirit and scope of the present invention.

What is claimed is:

1. A method for adjusting a light source for a microscope comprising:
    coupling an imaging optical reflection unit, instead of an objective, to the microscope in order to image the light of the light source on a detector in such a way that a monitoring of the focus position and/or the position and/or an adjustment of the light source with respect to the focus position and/or the position can be carried out.

2. The method according to claim 1, in which the imaging optical reflection unit is so dimensioned that the light of the light source is focused on the detector at the precise moment that the light source is focused on the exit pupil of the objective.

3. The method according to claim 1, in which a collecting mirror is used as imaging optical reflection unit.

4. The method according to claim 1, in which a lens or lens arrangement with a reflection element is used as imaging optical reflection unit.

5. The method according to claim 1, in which the reflection element can have a flat surface or a curved surface.

6. The method according to claim 1, in which the reflection element can be constructed as a reflecting surface on the lens or lens arrangement.

7. The method according to claim 1, in which a magnified image of the light source is imaged on the detector by the imaging optical reflection unit.

8. The method according to claim 1, in which the light of the light source is attenuated by an additional filter provided in the imaging optical reflection unit.

9. The method according to claim 1, in which the imaging optical reflection unit and the objective are arranged on an objective turret.

10. The method according to claim 1, in which a plurality of imaging optical reflection units and objectives can be arranged on the objective turret.

11. The method according to claim 1, in which the light source is a laser light source for TIRF illumination.

* * * * *